United States Patent Office 2,884,433
Patented Apr. 28, 1959

2,884,433

HALOGENATED SILOXANES

Donald D. Smith, Midland, Mich., assignor to Dow Corning Corporation, Midland, Mich., a corporation of Michigan No Drawing. Application March 7, 1957
Serial No. 644,444

6 Claims. (Cl. 260—448.2)

This invention relates to siloxanes derived from divinyl silanes having a halogenated cyclobutyl group, a trifluoropropyl group, a trifluorotolyl group, or a hexafluoroisohexyl group on the silicon.

More specifically this invention relates to a compound of the unit formula $$\left[ -\underset{R}{\overset{R_2}{Si}}(CH_2)_2\underset{R}{\overset{X}{Si}}(CH_2)_2SiO- \right]$$

where R is selected from the group consisting of aryl, alkyl and cyclo alkyl hydrocarbon radicals and X is selected from the group consisting of $CF_3CH_2CH_2-$, $$CF_3CH_2CH_2\overset{CF_3}{\underset{|}{CH}}CH_2-$$

a cyclobutyl group of the formula $C_4H_3F_3Cl-$ and

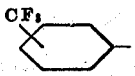

R can be any alkyl hydrocarbon radical, e.g. methyl, 2-ethyl-hexyl and octadecyl; any cycloalkylhydrocarbon radicals, e.g. cyclopentyl and cyclohexyl; and any aryl hydrocarbon radical, e.g. phenyl, tolyl, xenyl and naphthyl. X can be $CF_3CH_2CH_2-$, $$CF_3CH_2CH_2\overset{CF_3}{\underset{|}{CH}}CH_2-$$

ortho-, meta-, and para-trifluorotolyl radicals, $$\overline{CFClCF_2CH_2CH-} \text{ and } \overline{CF_2CFClCH_2CH-}$$

The chlorotrifluorocyclobutyl radicals are best attached to silicon as shown in the copending application of Arthur F. Gordon, Serial No. 494,287, filed March 14, 1955. The radicals $CF_3CH_2CH_2-$ and $$CF_3CH_2CH_2-\overset{CF_3}{\underset{|}{CH}}CH_2-$$

are best attached to silicon by reacting the corresponding olefins with SiH compounds at elevated temperatures.

The silylethylsilsiloxanes of this invention can be prepared by reacting silanes of the formula $$\underset{Y_2SiX}{\overset{R}{}}$$

where X and R are as above defined and Y is a hydrolyzable group such as halogen, e.g. chlorine, bromine, and iodine, or an alkoxy radical, e.g. methoxy and butoxy, with vinyl Grignard to form a divinyl silane. A preferred method for the preparation of vinyl Grignard reagents is disclosed by H. Normant, Compt. rend. 239, 1510, 1811; ibid., 240, 314, 440, 631.

Subsequently, the vinylsilane is reacted with a symmetrical tetraorganodisiloxane where the organic radicals are defined by R above. This reaction is best accomplished by cautiously heating the vinylsilane to 100° C. (or its boiling point if less than 100° C.) with a catalyst such as platinum on charcoal or chloroplatinic acid in dimethylcarbitol until the reaction becomes spontaneous and maintaining the reaction temperature between 150–175° C.

The preferred method of preparation is that of employing the above Grignard reaction to form a divinyl silane $$CH_2=CH\underset{R}{\overset{X}{Si}}CH=CH_2$$

which is reacted with a diorganomonohalosilane $$\overset{R_2}{\underset{}{HSiY}}$$

to form the disilylethyldihalosilcarbane $$Y\overset{R_2}{\underset{}{Si}}CH_2CH_2\underset{R}{\overset{X}{Si}}CH_2CH_2\overset{R_2}{\underset{}{Si}}Y$$

which can be hydrolyzed and condensed to form the silylethylpolysiloxane $$\left[ \overset{R_2}{\underset{}{Si}}CH_2CH_2\underset{R}{\overset{X}{Si}}CH_2CH_2\overset{R_2}{\underset{}{Si}}O \right]_n$$

An alternative of this method is the production of a silane of the formula $$CH_2=CH\overset{R_2}{\underset{}{Si}}Y$$

where R and Y are as above defined, subsequent reaction with a silane of the formula $$\underset{XSiH_2}{\overset{R}{}}$$

where X and R are as above defined and hydrolysis and condensation of the disilylethylsilcarbane to the polysiloxane. If desired the $$CH_2=CH\overset{R_2}{\underset{}{Si}}Y$$

silanes may first be condensed to disiloxanes $$CH_2=CH\overset{R_2}{\underset{}{Si}}O\overset{R_2}{\underset{}{Si}}CH=CH_2$$

and then reacted with $$\underset{X}{\overset{R}{HSiH}}$$

to give the polymers of this invention.

If desired, any of the above hydrolyses can be carried out in the presence of an inert solvent such as benzene, toluene, ether, and the like. In the silanes, divinyl disiloxanes and dihydrodisiloxanes used as starting materials, it is necessary that R be the non-reacting organic radicals above defined, to prevent extraneous and deleterious side reactions.

The siloxanes of this invention can be copolymerized to form copolymers comprising from 0.1 to 99.9 mol percent of the siloxanes of this invention and from 99.9 to 0.1 mol percent of compositions of the unit formula $$Z_mSiO_{\frac{4-m}{2}}$$

where Z can be any monovalent hydrocarbon radical or halogenated derivative thereof, and $m$ has an average value of from 1 to 3 inclusive. These copolymers can be prepared by any means of copolymerization such as cohydrolyzing a mixture of halo- or alkoxy-silanes of the formulae $$Y\overset{R_2}{\underset{}{Si}}(CH_2)_2\underset{X}{\overset{R}{Si}}(CH_2)_2\overset{R_2}{\underset{}{Si}}Y$$

and $Z_mSiY_{4-m}$ where X, R, Z, Y, and $m$ are as above defined and condensing the polysiloxane copolymer. Another method of preparation of the copolymers of this invention is catalytic copolymerization of the siloxanes of this invention with siloxanes of the formula $$Z_mSiO_{\frac{4-m}{2}}$$

preferably in the presence of an acid catalyst.

Z can therefore be alkyl, e.g. methyl, 2-ethylhexyl and octadecyl; cycloalkyl, e.g. cyclohexyl and cyclopentyl; halogenated alkyl, e.g. 2,3-dibromopropyl and 4-trifluoromethyl-decyl; halogenated cycloalkyl, e.g. 2,4,6-triiodocyclohexyl; aryl, e.g. phenyl, xenyl and naphthyl; halogenated aryl, e.g. 2,4-dichlorophenyl, β-bromonaphthyl, and bromoxenyl; aralkyl, e.g. benzyl; halogenated aralkyl, e.g. α-chlorobenzyl and 2,4-dichlorobenzyl; alkaryl, e.g. tolyl; halogenated alkaryl, e.g. trifluorotolyl; alkenyl, e.g. vinyl, allyl and 5,6-octadecenyl; cycloalkenyl, e.g. 2,3-cyclopentenyl; halogenated alkenyl, e.g. 3-iodoallyl, sym-dibromovinyl; and halogenated cycloalkenyl, e.g. 4,5-dichloro-2,3-cyclohexenyl. Z can also be any of the groups defined by X.

The siloxanes of this invention are especially useful as lubricants. They are also useful as coatings, elastomers, and molding resins.

The following examples are illustrative only and should not be construed as limiting the invention which is properly set forth in the appended claims.

*Example 1*

(a) Trifluoropropylmethyldichlorosilane was dissolved in an equal volume of tetrahydrofuran, and the solution was added slowly with stirring to a solution of vinyl Grignard in tetrahydrofuran in a ratio of one mol of silane to two mols of Grignard reagent. During the reaction the reaction flask was cooled by an ice water bath. When the silane addition was complete, the reaction mixture was allowed to warm to room temperature. The contents of the reaction flask were poured into an ice water mixture, and hydrochloric acid was added to dissolve magnesium salts. The organic layer was separated, washed with water several times to remove most of the tetrahydrofuran, and dried with calcium hydride. The dried organic layer was distilled and a 52% yield of trifluoropropylmethyldivinylsilane was obtained with the following properties: B.P. (° C.), 134/atm.; $n_D^{25}$, 1.395.

(b) This silane was heated to 100° C. with a catalyst composed of .06% by weight platinum on charcoal. The catalyst was employed in amount so that there was one gram of catalyst per mol of silane. Sym-tetramethyldisiloxane was added slowly so that the temperature of the spontaneous reaction was maintained in the range 150–175° C. until the addition was complete. The reaction mixture was cooled, diluted with ether and filtered. The ether was removed by distillation at atmospheric pressure. The residual fluid was heated to 150° C. at a pressure of approximately 1 mm. Hg to remove low molecular weight materials and was refiltered. The product was a fluid polymer of the unit formula

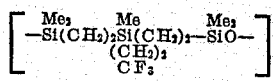

(c) This polymer was tested for lubricity in a Shell 4-ball wear tester at 1200 r.p.m. for two hours at 75° F. with various loads. The results (scar diameter in millimeters) were as follows:

| Load_____kg__ | 4 | 10 | 40 |
|---|---|---|---|
| Scar_____ | 0.2 | 0.25 | 0.62 |

*Example 2*

5,5,5-trifluoro-2-(trifluoromethyl)amylmethyldichlorosilane was substituted for the silane of Example 1(a). A 56% yield of 5,5,5-trifluoro-2-(trifluoromethyl)amylmethyldivinylsilane was obtained with the following properties: B.P. (° C.), 89/30 mm.; $n_D^{25}$, 1.3903. Subsequent reaction of the divinylsilane with sym-tetramethyldisiloxane according to the method of Example 1 produced a polymer of the unit formula

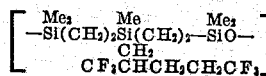

This polymer was tested for lubricity according to the method of Example 1. The results were as follows:

| Load_____kg__ | 4 | 10 | 40 |
|---|---|---|---|
| Scar_____ | 0.2 | 0.33 | 0.68 |

*Example 3*

When p-α,α,α-trifluorotolylmethyldichlorosilane and β,γ,γ-trifluoro-β-chlorocyclobutylmethyldichlorosilane were substituted for the chlorosilane in Example 1(a), the corresponding divinylsilanes and silylethylsiloxanes resulted, i.e.

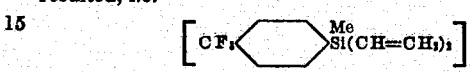

and

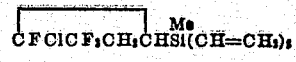

and polymers of the unit formulae

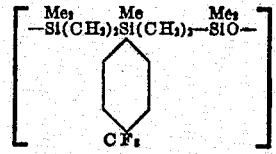

and

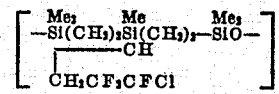

respectively. The siloxanes were suitable as lubricants.

*Example 4*

When monochlorodimethylsilane was substituted for the sym-tetramethyldisiloxane of Example 1(b) and the resulting product was hydrolyzed, a fluid polysiloxane of the unit formula

was obtained.

*Example 5*

When methyl-3,3,3-trifluoropropyldivinylsilane and phenyloctadecylmonochlorosilane are reacted in accordance with the method of Example 1 in a molar ratio of 1:2 and the reaction product is hydrolyzed and condensed with dichlorophenylvinyldichlorosilane in a molar ratio of one mol of the reaction product to one mol of the dichlorosilane, a thermoplastic copolymer is formed consisting of

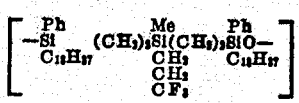

and

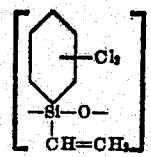

units.

*Example 6*

When p-α,α,α-trifluorotolyl-2-ethyl-hexyldivinylsilane and dixenylmonoethoxysilane are reacted in accordance with the method of Example 1 in a molar ratio of 1:2 and the reaction product is cohydrolyzed and cocondensed with bis-3,3,3-trifluoropropyldiethoxysilane in a molar ratio of two mols of the reaction product to one mol of the diethoxysilane, the resulting thermoplastic copolymer consists of

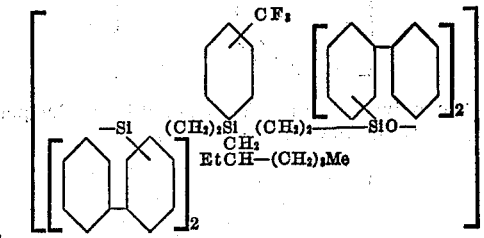

and

units.

Example 7

When 5,5,5-trifluoro-2-trifluoromethylamyltolyldivinylsilane and dicyclohexylmonochlorosilane are reacted in accordance with the method of Example 1 in a molar ratio of 1:2 and the reaction product is cohydrolyzed and cocondensed with tolyl-3,4-cyclopentenyl-2-ethyl-hexyl-chlorosilane in a molar ratio of 1:1, there results a fluid copolymer which consists of

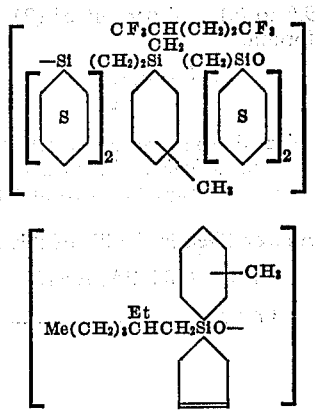

and

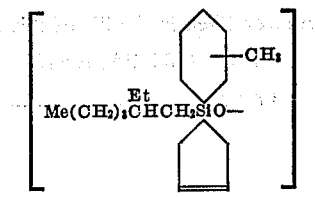

units.

Example 8

When 3,3,3 - trifluoropropylphenyldivinylsilane and methylnaphthyl monochlorosilane are reacted in accordance with the method of Example 1 in a molar ratio of 1:2 and the reaction product is hydrolyzed and condensed with silicon tetrachloride in a molar ratio of four mols of the reaction product to one mol of silicon tetrachloride, a resinous copolymer results which consists of

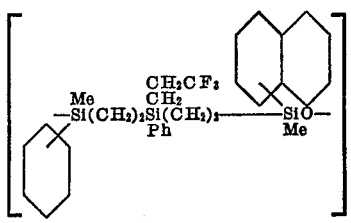

and [SiO₂] units.

Example 9

When β,γ,γ - trifluoro-β-chlorocyclobutylphenyldivinylsilane and dimethylmonochlorosilane are reacted in accordance with the method of Example 1 in a molar ratio of 1:2 and the reaction product is hydrolyzed and condensed with benzyltrichlorosilane in a molar ratio of five mols of the reaction product per mol of the trichlorosilane, a resinous copolymer results which consists of

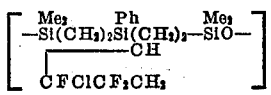

and

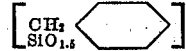

units.

Example 10

When an equimolar mixture of trifluorotolylmethyl divinylsilane, β,γ,γ - trifluoro - β-chlorocyclobutylphenyldivinylsilane, phenylbutylmonochlorosilane and 2-ethyl-hexylxenylmonochlorosilane is reacted in accordance with the method of Example 1 and the reaction product is hydrolyzed and condensed with an equimolar mixture of cyclohexyltrichlorosilane, phenyl-2-ethyl-6-bromo-hexyl-amylchlorosilane, tolylbenzyldichlorosilane and silicon tetrachloride, a copolymer results which consists of 12.5 mol percent each of the following units:

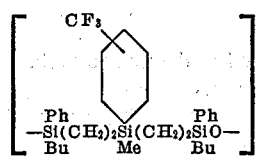

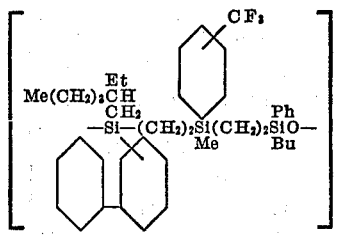

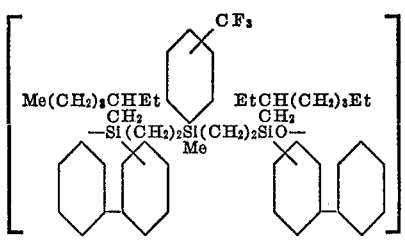

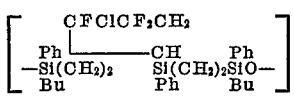

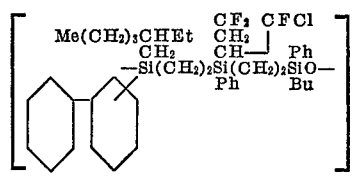

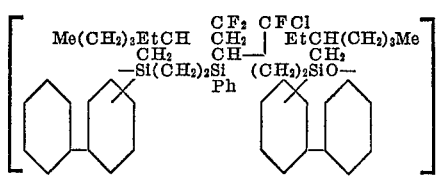

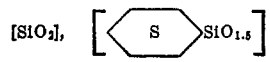

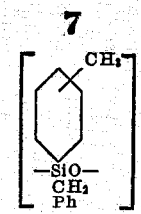

and

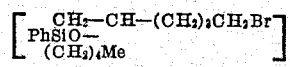

That which is claimed is:

1. A compound of the unit formula

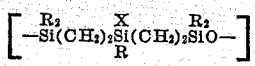

where R is selected from the group consisting of aryl, alkyl and cycloalkyl hydrocarbon radicals and X is selected from the group consisting of

and

2. A compound of the unit formula

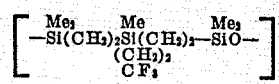

3. A compound of the unit formula

4. A compound of the unit formula

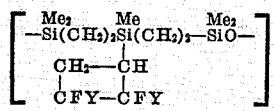

where one Y is fluorine and the other Y is chlorine.

5. A compound of the unit formula

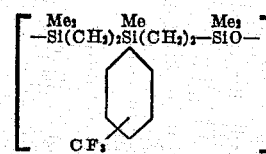

6. A copolymer comprising from 0.1 to 99.9 percent of (1) a composition of the unit formula

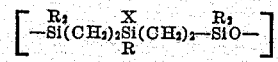

where R is selected from the group consisting of aryl, alkyl and cycloalkyl hydrocarbon radicals and X is selected from the group consisting of

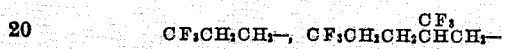

and

and from 99.9 to 0.1 mol percent of (2) a composition of the unit formula $$Z_m SiO_{\frac{4-m}{2}}$$

where Z is selected from the group consisting of monovalent hydrocarbon radicals and their halogenated derivatives and $m$ has an average value from 1 to 3 inclusive.

References Cited in the file of this patent

FOREIGN PATENTS 1,116,316    France _____ Jan. 30, 1956

UNITED STATES PATENT OFFICE
Certificate of Correction

April 28, 1959

Patent No. 2,884,433     Donald D. Smith

It is hereby certified that error appears in the printed specification of the above numbered patent requiring correction and that the said Letters Patent should read as corrected below.

Column 5, lines 30 to 37 inclusive, Example 7, first formula should appear as shown below instead of as in the patent—

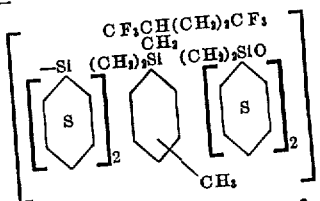

same column 5, lines 58 to 66 inclusive, Example 8, the formula should appear as shown below instead of as in the patent—

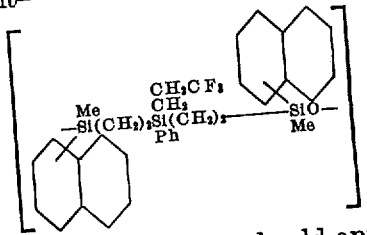

column 7, lines 20 and 21, claim 1, the formula should appear as shown below instead of as in the patent—

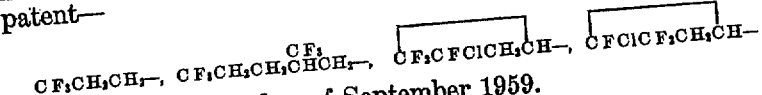

Signed and sealed this 8th day of September 1959.

[SEAL]

Attest:
KARL H. AXLINE,
*Attesting Officer.*

ROBERT C. WATSON,
*Commissioner of Patents.*